United States Patent Office 2,987,492
Patented June 6, 1961

2,987,492
LACQUER COMPOSITION

Raymond G. Pinder, Rochester, N.Y., assignor to Eastman Kodak Company, Rochester, N.Y., a corporation of New Jersey
No Drawing. Filed Mar. 13, 1958, Ser. No. 721,079
5 Claims. (Cl. 260—23)

This invention concerns a lacquer which may be applied on various surfaces including metal, plastic, wood and the like. In addition, this invention concerns a lacquer which may be coated on a transparent base to provide a surface which may be used for a rear projection screen.

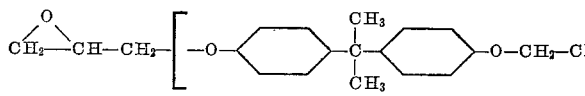 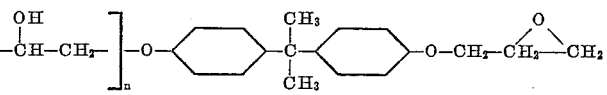

In the course of manufacturing various objects it is often desirable to make the parts from different materials. For instance, those parts which are subjected to considerable wear, stress or strain may be made of metal while other parts may be fabricated from plastics. In order to provide an attractive appearance it has been desired to lacquer the finished object with a coating which would provide a uniform appearance whether the parts were plastic or metal. However, in order to obtain such a lacquer there have been problems of adhesion since some materials do not adhere readily to all types of substrates.

A related problem is that of obtaining a diffuse screen material which would enable photomicrographs to be projected in an enlarged form with sufficient resolving power to enable them to be read easily. In the past there have been many coating materials which were believed to provide such a screen by coating onto a transparent material but many of these were expensive or resulted in structurese which were not practical for modern production or use. One use for such a product is in a microfilm viewer in which a photographic transparency made of a printed page is projected against the back of a translucent material which has a surface similar to that of ground glass. For this purpose, ground glass could be used but due to the fragile nature of the glass and the expense, this material is not practical. Some other surfaces which have been tried have such coarse granular components in the coating composition that the resolving power of the rear projection screen is poor and the resulting image appears fuzzy. Accordingly, it has been desirable to obtain a lacquer which could be coated on a clear transparent plastic surface which would provide a rear projection screen with a high degree of resolving power.

I have discovered a coating composition which may be applied with equal success to a variety of substrates including metals (such as zinc, steel, aluminum, etc.), thermosetting plastics (such as phenolics and melamines) and thermoplastics (such as cellulose acetate butyrate, polystyrene, polyacrylics, and the like). This coating has the characteristic of providing durability as well as good adhesion without attacking the substrate to which it is applied. Moreover, when formulated with appropriate reflecting and diffusing agents, the coating may be used to provide a rear projection screen and a front projection screen.

One object of this invention is to provide a lacquer which can be spray coated readily and which has good adhesion to various substrates. Another object is to provide a lacquer formulation which can be pigmented to provide a uniform covering for different materials. A further object is to provide a process for making a lacquer which can be varied readily to use as a pigmented coated composition or as a translucent coating for a rear projection screen. Another object is to provide a reflective coating for a front projection screen. Other objects will appear from the description of my invention contained herein.

The above objects are obtained by combining certain polymeric materials in a solvent mixture.

The essential ingredients of my lacquer are an epoxide resin, a polyamide resin, and an acrylic resin, in a compatible solvent mixture, together with suitable agents such as pigments and dyes.

The epoxide resin represents a class of condensation polymers which have the following structure:

in which $n$ is a whole number from 1 to 5.

The polyamide resin has a general formula:

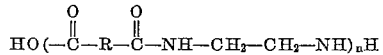

wherein $n$ is a whole number from 5 to 15 and R is an alkylene group having from 5 to 20 carbon atoms. A particularly useful component is the polyamide having the above formula in which R is $C_{17}H_{34}$.

The acrylic resin which is preferably used is a methyl methacrylate homopolymer.

In preparing the lacquer, the epoxide resin is dissolved in a solvent such as ethylene glycol monoethyl ether after which the acrylic resin is added along with ethyl alcohol. At the time of application to the substrate the polyamide dissolved in an ethylene glycol monoethyl ether and ethyl alcohol mixture is added as a separate component part.

When used as a lacquer, dyes, pigments and suitable solvents can be added to obtain the desired consistency for spraying. When used for a coating in providing a rear projection screen, magnesium silicate is dispersed in the resin solvent mixture along with a small amount of yellow and black dyes. Although our preferred resins are described above, other epoxide resins may be used.

Other amine type materials such as primary and tertiary amines may be used in place of the preferred polyamide resin shown herein. Instead of the acrylic resin described above other acrylic polymers such as the homopolymers of methyl acrylate and ethyl acrylate may be used or copolymers of methyl acrylate with ethyl acrylate.

The reactions of the epoxide resins with polyamide resins is described in an article entitled "Coatings of Polyamide and Epoxy Resin Blends" by Renfrew et al, Industrial and Engineering Chemistry, volume 46, No. 10, pages 2226 to 2632 and particularly at page 2227.

The following lacquer illustrates my preferred embodiment.

Black metallic enamel

| | Percent by weight |
|---|---|
| Component part A: | |
| Epoxide resin | 31 |
| Ethylene glycol monoethyl ether | 33 |
| Silica | 5 |
| Isopropanol | 8 |
| Aluminum bronze paste, non-leafing | 4 |
| Furnace black | 10 |
| Toluol | 10 |
| Component part B: | |
| Polyamide resin | 10 |
| Methyl methacrylate homopolymer | 15 |
| Silicone oil | 3 |
| Ethylene glycol monoethyl ether | 40 |
| Isopropanol | 32 |

The epoxy resin may be Shell Epon 1001. The silica may be Cabosil. The polyamide resin may be Versamid 125, General Mills. The silicone oil may be Dow-Corning 200, 33 centistokes viscosity.

The proportions may be varied depending upon the substrate, the method of application, brush or spray and the like. The epoxide resin (A) may vary from 10–20% by weight, the acrylic resin (B) from 12–18% and the polyamide (E) from 20–10%. However, certain relationships are necessary. $A+E$ should equal $2B$.

In order to obtain a pleasing appearance, various pigments may be added to the lacquer after it has been prepared in the compatible solvent mixture. For instance, metallic bronze powder, leafing or nonleafing such as aluminum, copper or gold bronze powder may be used if finely divided and if preferably of a size shown in the ASTM standards, January 1955, page 131, type 1, class A.

The following examples are intended to illustrate various embodiments of my invention but are not intended to limit it in any way.

*Example 1.*—The following lacquer was prepared in two component parts A and B for use in preparing a rear projection screen.

Preferred amounts
Weight (lb.), percent

Component part A:
- (A) Epoxide resin _____ 16
- (B) Methyl methacrylate homopolymer _____ 11
- (C) Cellosolve _____ 65
- (D) Ethyl alcohol _____ 8

Component part B:
- (E) Polyamide _____ 7
- (F) Cellosolve _____ 51
- (G) Isopropyl alcohol _____ 19
- (H) Magnesium silicate _____ 23
- (I) Trace lamp black.
- (J) Trace iron oxide yellow.

The use of tinting pigments (I) and (J) is incorporated in the formula for color correction and control. However, these may be omitted and a useful rear projection screen prepared without their incorporation. When a front projection screen is desired, larger amounts of tinting pigments or dyes may be incorporated. The solvents, (C), (D), (F) and (G) may be varied according to the compatibility demands of the resins (A), (B), and (E) and the substrate on which it is applied.

*Example 1.*—The above formulation was applied to transparent polystyrene, cellulose acetate butyrate, polyethyl acrylate and glass. After applying a full coat, the lacquer was cured 1 hour at 140°–170° F. It can also be cured by permitting to air dry overnight or by heating 10–20 minutes at 300°–400° F. The time and temperature vary inversely with relation to each other.

*Example 2.*—A lacquer formulation the same as that used in Example 1 was prepared except that half of the magnesium silicate was replaced with aluminum bronze powder and the lacquer coated on polystyrene. A front projection screen having good photographic properties was obtained. In a similar manner other plastic surfaces such as cellulose acetate butyrate, and the like could be used.

*Example 3.*—A general purpose black metallic enamel coating composition described above was applied to metals, phenolics, polyacrylics, polystyrene and cellulosic derivative substrates without attacking the substrate and providing excellent adhesion and durability.

Component parts A and B were mixed in equal volume prior to application. After application the coatings were air dried. In our preferred embodiment, the ratio of resins (A), (E), and (B) was kept at 4:3:2 for best results. The incorporation of the silicone oil provided a good surface for scuff resistance but is not necessary for the operation of my invention.

When used for coating articles other than rear projection screens, pigments may be used in place of the magnesium silicate, lamp black and yellow dye. The pigments may be any of the standard coloring agents used in paint and lacquer formulations such as titanium dioxide, carbon black, iron blue, chrome green, etc.

The component parts A and B may be separately packaged in sealed containers if not to be used promptly. Accurate volumes of component parts A and B are mixed together when the lacquer is to be coated on the substrate.

The lacquer coating may be air or force dried at temperatures up to 400° F. to effect curing, the baking schedule being dependent upon the limitations or requirements of the substrate.

I claim:

1. A lacquer composition, the essential constituents of which comprise in an organic solvent 10–20% by weight of an epoxide (A) having the typical structure:

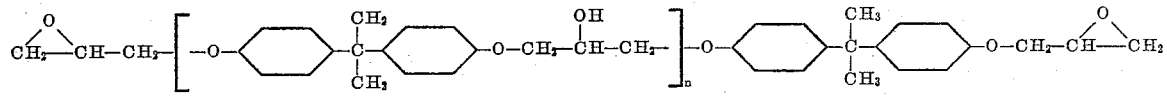

wherein $n$ is a whole number from 1 to 5, 12–15% of an acrylic resin (B) selected from the class consisting of homopolymers of methyl methacrylate, methylacrylate and ethylacrylate and copolymers of methylacrylate with ethylacrylate, and 20–10% of a polyamide resin (E) having the typical structure:

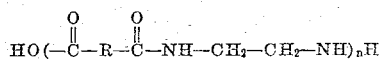

wherein $n$ is a whole number from 5 to 15 and R is an alkyl group having from 5 to 20 carbon atoms so that $A+E=2B$.

2. A rear projection screen comprising a transparent organic polymeric support having coated thereon a lacquer, the essential constituents comprising an organic solvent 10–20% by weight of an epoxide resin (A) having the typical structure:

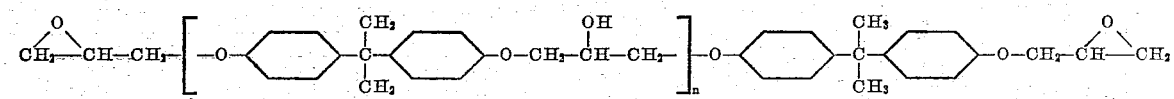

wherein $n$ is a whole number from 1 to 5, 12–15% of an acrylic resin (B) selected from the class consisting of homopolymers of methyl methacrylate, methylacrylate and ethylacrylate and copolymers of methylacrylate with ethylacrylate, and 20–10% of a polyamide resin (E) having the typical structure:

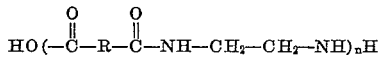

wherein n is a whole number from 5 to 15 and R is an alkyl group having from 5 to 20 carbon atoms so that $A+E=2B$.

3. A lacquer composition, the essential constituents of which comprise in an organic solvent 10–20% by weight of an epoxide (A) having the typical structure:

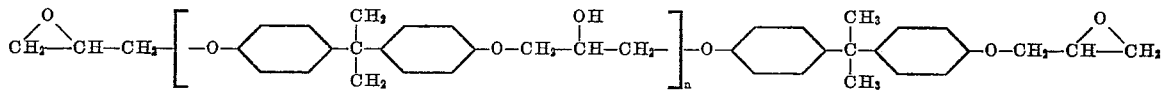

wherein n is a whole number from 1 to 5, 12–15% of an acrylic resin (B) selected from the class consisting of homopolymers of methyl methacrylate, methylacrylate and ethylacrylate and copolymers of methylacrylate with ethylacrylate, and 20–10% of a polyamide resin (E) having the typical structure:

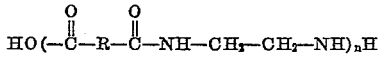

wherein n is a whole number from 5 to 15 and R is an alkyl group having from 5 to 20 carbon atoms so that $A+E=2B$ and containing magnesium silicate dispersed therein.

4. A lacquer composition, the essential constituents of which comprise in an organic solvent 10–20% by weight of an epoxide (A) having the typical structure:

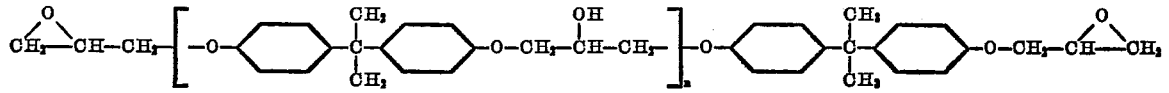

wherein n is a whole number from 1 to 5, 12–15% of an acrylic resin (B) selected from the class consisting of homopolymers of methyl methacrylate, methylacrylate and ethylacrylate and copolymers of methylacrylate with ethylacrylate, and 20–10% of a polyamide resin (E) having the typical structure:

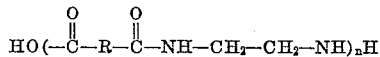

wherein n is a whole number from 5 to 15 and R is an alkyl group having from 5 to 20 carbon atoms so that $A+E=2B$ and containing silica, aluminum bronze paste and carbon black.

5. A lacquer composition, the essential constituents of which comprise in an organic solvent approximately 16% of an epoxide resin having the typical structure:

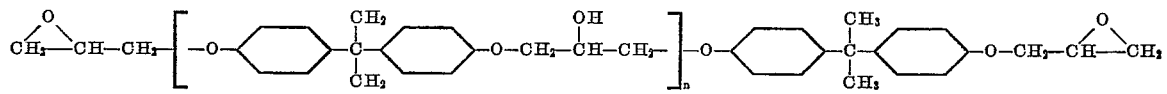

wherein n is a whole number from 1 to 5, approximately 7% of the polyamide resin having the typical structure:

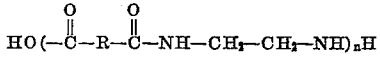

wherein n is a whole number from 5 to 15 and R is an alkyl group having from 5 to 20 carbon atoms, approximately 11% of a methyl methacrylate homopolymer and approximately 23% magnesium silicate.

References Cited in the file of this patent

UNITED STATES PATENTS

| | | |
|---|---|---|
| 2,728,737 | Wittcoff | Dec. 27, 1955 |
| 2,811,495 | Wittcoff et al. | Oct. 29, 1957 |
| 2,842,459 | Gollub et al. | July 8, 1958 |
| 2,865,870 | Pinder | Dec. 23, 1958 |

FOREIGN PATENTS

| | | |
|---|---|---|
| 516,107 | Canada | Aug. 30, 1955 |

OTHER REFERENCES

Speyer: Polyamide Resin Suspensoids, Paint, Oil and Chem. Rev., pp. 7–11, 30–31, January 3, 1952.